US009570862B2

(12) United States Patent
Kawai et al.

(10) Patent No.: US 9,570,862 B2
(45) Date of Patent: Feb. 14, 2017

(54) TERMINAL AND CHARGING CONNECTOR (71) Applicant: YAZAKI CORPORATION, Tokyo (JP)

(72) Inventors: Ryuji Kawai, Kakegawa (JP);
Hirotaka Fukushima, Kakegawa (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 14/978,465

(22) Filed: Dec. 22, 2015

(65) Prior Publication Data
US 2016/0111831 A1     Apr. 21, 2016

Related U.S. Application Data (63) Continuation of application No. PCT/JP2014/066951, filed on Jun. 26, 2014.

(30) Foreign Application Priority Data

Jun. 27, 2013  (JP) .................................. 2013-134631

(51) Int. Cl.
H01R 13/66    (2006.01)
H01R 13/04    (2006.01)
H01R 13/627   (2006.01)

(52) U.S. Cl.
CPC .......... *H01R 13/6683* (2013.01); *H01R 13/04* (2013.01); *H01R 13/6278* (2013.01)

(58) Field of Classification Search
CPC ................................................ H01R 13/6683
See application file for complete search history.

(56) References Cited

U.S. PATENT DOCUMENTS 4,699,445 A * 10/1987 Porta ..................... H01R 13/11
                                                         439/698

FOREIGN PATENT DOCUMENTS

| JP | 3-44637 A | 4/1991 |
| JP | 5-159180 A | 6/1993 |
| JP | 5-50664 U | 7/1993 |
| JP | 06-072180 U | 10/1994 |
| JP | 2003-28902 A | 1/2003 |
| JP | 2011-139572 A | 7/2011 |

OTHER PUBLICATIONS

International Search Report for PCT/JP2014/066951 dated Sep. 16, 2014.
Communication dated Sep. 6, 2016, issued by the Japan Patent Office in corresponding Japanese Application No. 2013-134631.
Communication dated Nov. 1, 2016, from the Japanese Patent Office in counterpart Japanese application No. 2013-134631.

* cited by examiner

*Primary Examiner* — Ross Gushi
(74) *Attorney, Agent, or Firm* — Sughrue Mion, PLLC (57) ABSTRACT In a terminal including: a terminal body that has a mating terminal contact part with which a mating terminal is brought into contact, and a sensor fixing part; and a thermistor fixed to the sensor fixing part, and a charging connector using the terminal, the sensor fixing part has a cylindrical shape in which the thermistor is inserted, the thermistor has a lock part, and is allowed to be inserted in the sensor fixing part by elastic deformation of the sensor fixing part, and at an insertion completion position, the lock part is locked to the sensor fixing part.

2 Claims, 9 Drawing Sheets

TERMINAL AND CHARGING CONNECTOR

CROSS REFERENCE TO RELATED APPLICATIONS

This application is a Continuation of PCT Application No. PCT/JP2014/066951 filed on Jun. 26, 2014, and claims the priority of Japanese Patent Application No. 2013-134631 filed on Jun. 27, 2013, the content of both of which is incorporated herein by reference.

TECHNICAL FIELD

The present invention relates to a terminal and a charging connector using the same.

BACKGROUND ART

Contact resistance is generated in a terminal at the time of energization, and detection of heat generated due to the contact resistance is effective for preventing damage of an electrical wire, a connector, and the like by overcurrent energization. Therefore, a unit configured to detect a heat generation temperature of a terminal connection point has been proposed (Patent Literatures 1 and 2).

Figure 9:
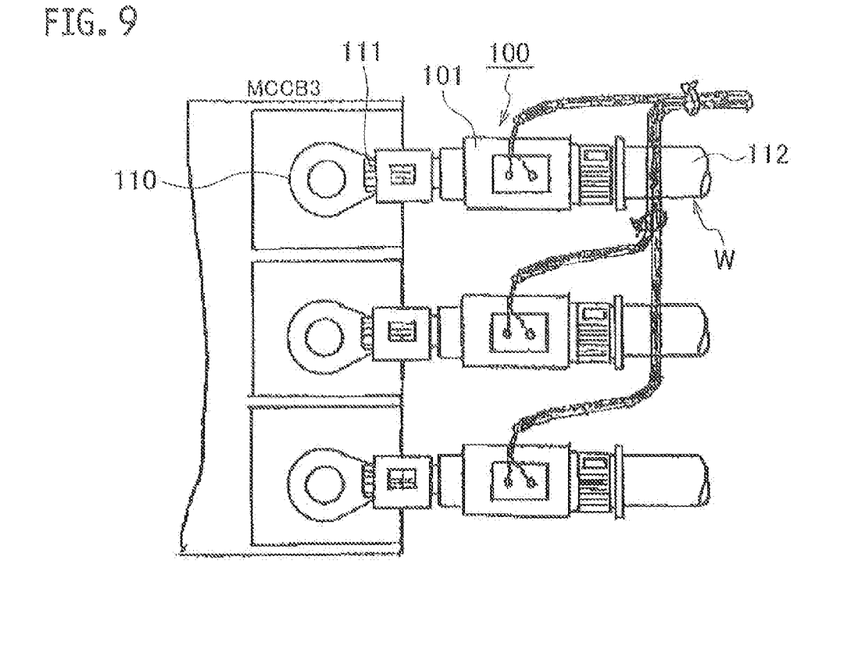
FIG. 9 is a plan view of a temperature detection unit of a conventional example.
Figure 10:
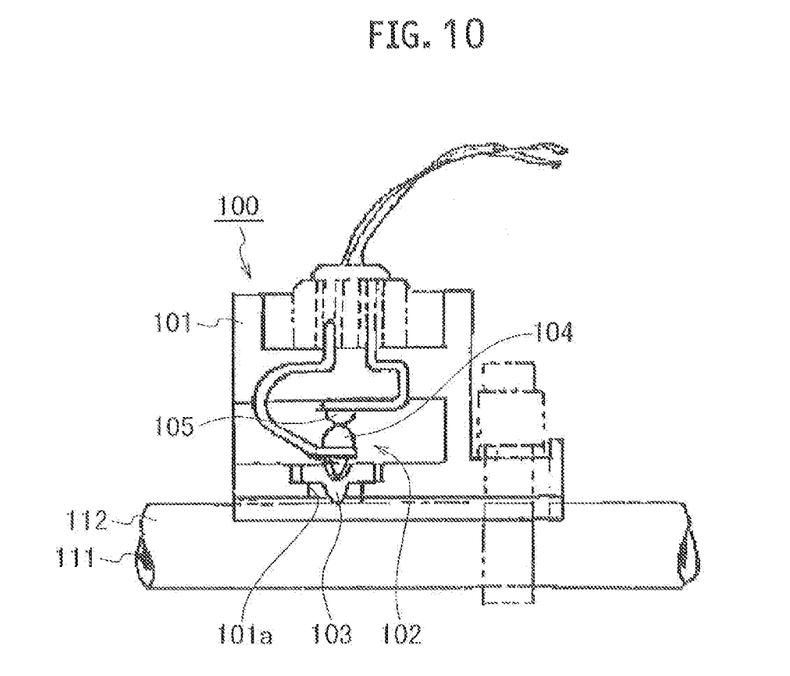
FIG. 10 is a schematic configuration view of the temperature detection unit of the conventional example.

A temperature detection unit 100 of Patent Literature 1 has: a housing part 101 attached to a covering part 112 of an electrical wire W to which a terminal 110 has been connected; and a temperature detection part 102 fixed in the housing part 101, as shown in FIGS. 9 and 10. The temperature detection part 102 has: a melting piece 103 that abuts against the covering part 112 of the electrical wire W through a hole 101a of the housing part 101; and a pair of contact parts 104 and 105 that are elastically bent and deformed by the melting piece 103, and that are thereby brought into contact with each other. A terminal point generates heat by energization of overcurrent, and the generated heat is transferred to a core wire 111 and the covering part 112 of the electrical wire W. The melting piece 103 melts by the generated heat transferred to the covering part 112, and the pair of contact parts 104 and 105 are deformed in elastic restoration directions, and separate from each other. Therefore, energization of the overcurrent is detected, and damage or the like of the terminal 110, the electrical wire W, and the like due to the overcurrent is prevented.

Figure 11:
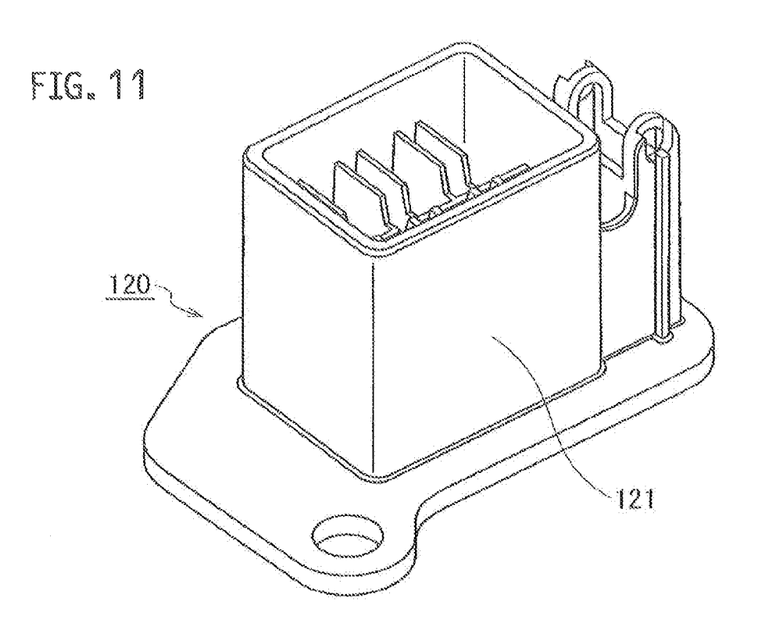
FIG. 11 is a perspective view of a connector to which a temperature detection unit of another conventional example has been applied.
Figure 12:
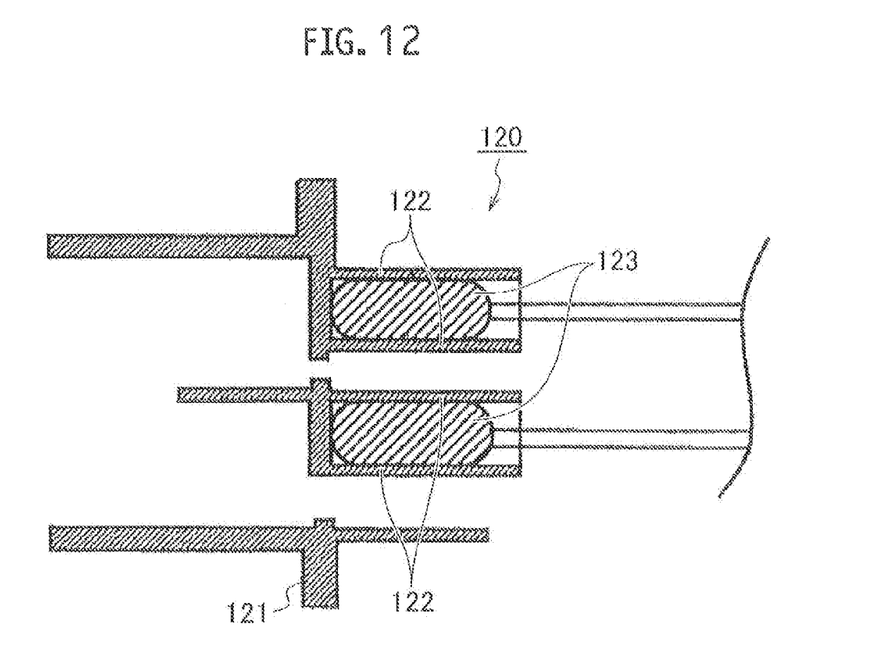
FIG. 12 is a cross-sectional view of the temperature detection unit of the another conventional example.

A temperature detection unit 120 of Patent Literature 2 includes: a connector housing 121 inside which a terminal (not shown) is housed; and a thermistor 123, as shown in FIGS. 11 and 12. The connector housing 121 has a sensor housing wall 122 on an opposite side of a side where the terminal has been housed, and the thermistor 123 is housed in the sensor housing wall 122. A terminal point generates heat by energization of overcurrent, and the generated heat is transferred to the connector housing 121. Namely, a temperature by the heat transferred to the thermistor 123 through the connector housing 121 is detected. Therefore, energization of the overcurrent is detected, and damage of the terminal, the connector housing 121, and the like by the overcurrent is prevented.

CITATION LIST

Patent Literature

Patent Literature 1: Japanese Patent Laid-Open Publication No. 05-159180

Patent Literature 2: Japanese Patent Laid-Open Publication No. 2011-139572

SUMMARY OF INVENTION

Technical Problem

However, since the heat generation temperature transferred from the terminal connection point to the core wire 111 and the covering part 112 is detected in an example of Patent Literature 1, a temperature of the terminal connection point cannot be detected with high accuracy. Particularly, when an installation position of the temperature detection unit 100 is located outside a connector, the temperature detection unit 100 is also affected by an outside air temperature, and a detection temperature has large variation.

Since the thermistor 123 detects the heat generation temperature transferred from the terminal connection point via the connector housing 121 in an example of Patent Literature 2, a temperature of the terminal connection point cannot be detected with high accuracy in the same way as in the example of Patent Literature 1. Particularly, since the thermistor 123 is located on a side opposite to an installation side of the terminal, and moreover, detects the temperature transferred via the sensor housing wall 122, deterioration of accuracy is inevitable.

Consequently, the present invention has been made in order to solve the above-described problems, and an object of the present invention is to provide a terminal and a charging connector using the same that can detect, with high accuracy, a heat generation temperature by energization of overcurrent of a terminal connection point.

Solution to Problem

The present invention is a terminal including: a terminal body that has a mating terminal contact part with which a mating terminal is brought into contact, and a sensor fixing part; and a temperature sensor fixed to the sensor fixing part.

The sensor fixing part has a cylindrical shape in which the temperature sensor is inserted, and the temperature sensor has a lock part, and it is preferable that the temperature sensor is allowed to be inserted in the sensor fixing part by elastic deformation of at least either one of the lock part and the sensor fixing part, and at an insertion completion position, the lock part is locked to the sensor fixing part by restoring elastic deformation.

The terminal body has an electrical wire connection part, and the sensor fixing part is preferably provided between the mating terminal contact part and the electrical wire connection part.

Another invention is a charging connector including: the terminal described above; and a connector housing that houses the terminal.

DESCRIPTION OF EMBODIMENTS

Hereinafter, embodiments of the present invention will be explained based on drawings.

First Embodiment

FIGS. 1 to 4 show a first embodiment of the present invention. The present invention is applied to a terminal 10A of a charging connector 1 in the first embodiment. Hereinafter, the first embodiment will be explained.

Figure 1:
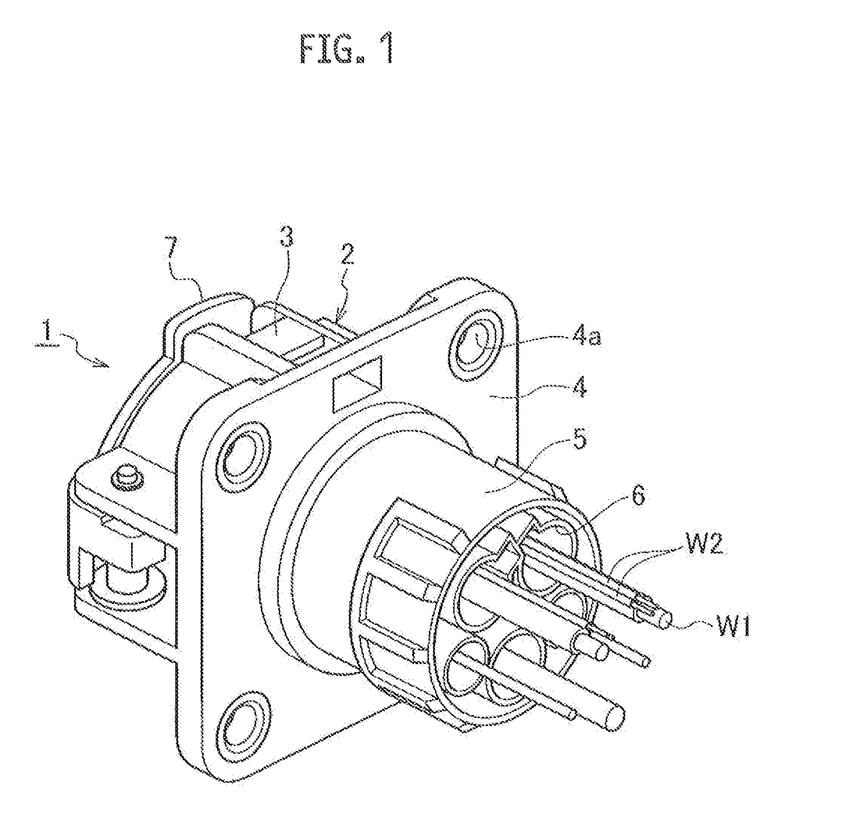
FIG. 1 is a perspective view of a charging connector showing a first embodiment of the present invention.
Figure 2:
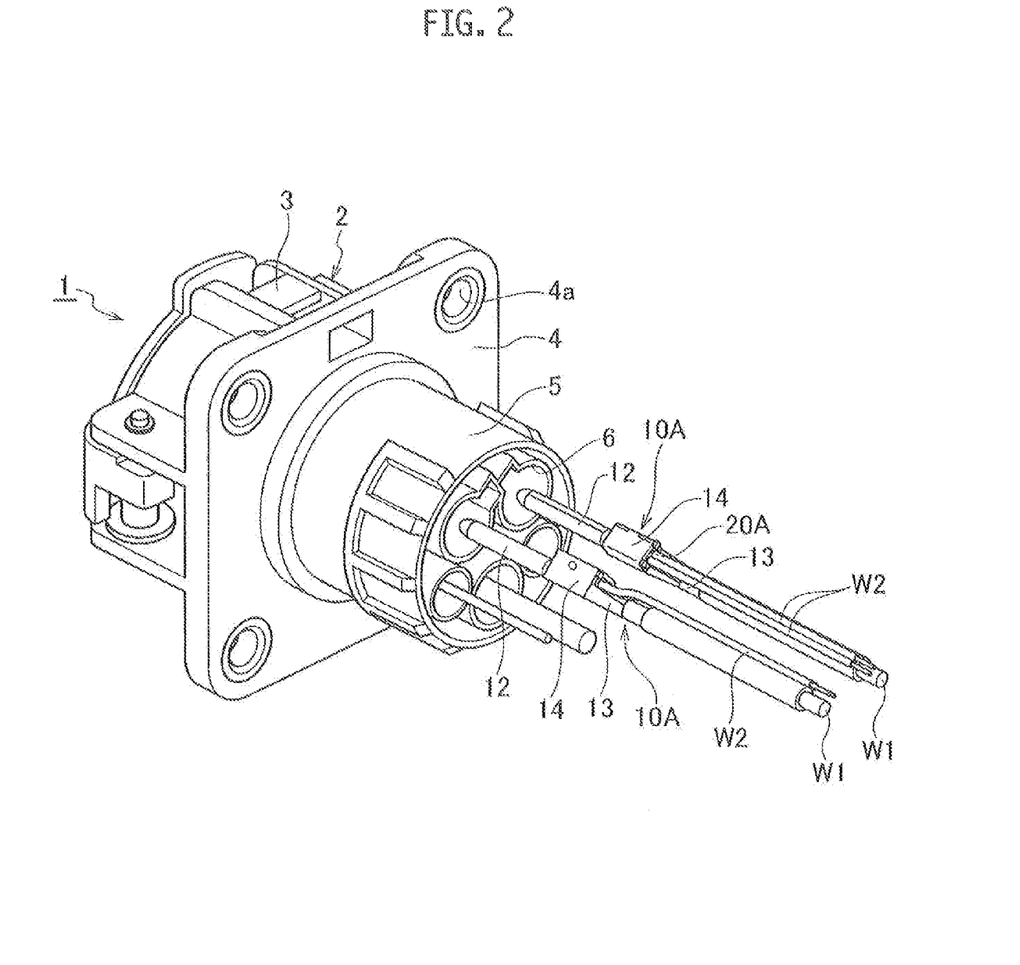
FIG. 2 is an exploded perspective view of the charging connector showing the first embodiment of the present invention.

As shown in FIGS. 1 and 2, the charging connector 1 is a power-receiving-side connector mounted on a vehicle. The charging connector 1 includes: a connector housing 2 having a plurality of terminal housing chambers 6; and a plurality of terminals 10A housed in each terminal housing chamber 6. The connector housing 2 has: a connector fitting part 3; an attachment flange part 4 that projects from the connector fitting part 3 to a side; and an inner cylindrical part 5 that projects from the attachment flange part 4 to an opposite side of the connector fitting part 3. A tip side of the terminal housing chamber 6 is opened to a front end surface of the connector fitting part 3, and a mating female terminal (not shown) is inserted from the opening. A tip surface of the connector fitting part 3 is opened and closed by a lid 7. The charging connector 1 is fixed to a vehicle-body side by using a bolt through the utilization of an attachment hole 4a of the attachment flange part 4. Each terminal housing chamber 6 is opened to a rear end surface of the inner cylindrical part 5. The terminal 10A is inserted through the each opening, and is fixed at a predetermined insertion position. An electrical wire W1 connected to each terminal 10A is pulled out to an inside of a vehicle body through each opening.

As shown in FIG. 2, the two terminals 10A provided for power reception, and one ground terminal (not shown) are housed in the connector housing 2. However, the number of terminals 10A housed in the connector housing 2 is not limited to two, and can be varied depending on design change of the power-receiving-side connector, or the like.

Figure 3A:
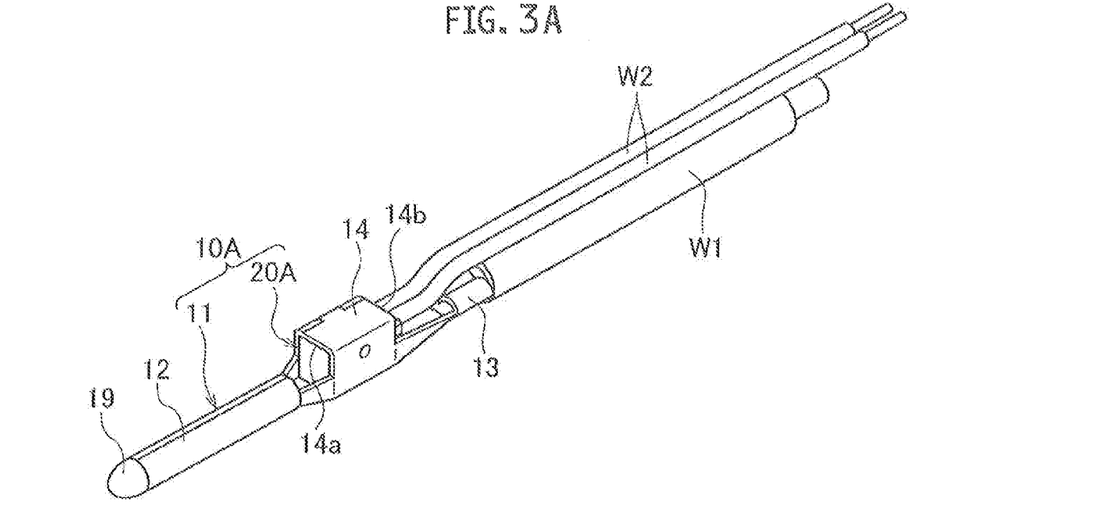
FIG. 3A shows the first embodiment of the present invention, and is a perspective view of a terminal.
Figure 3B:
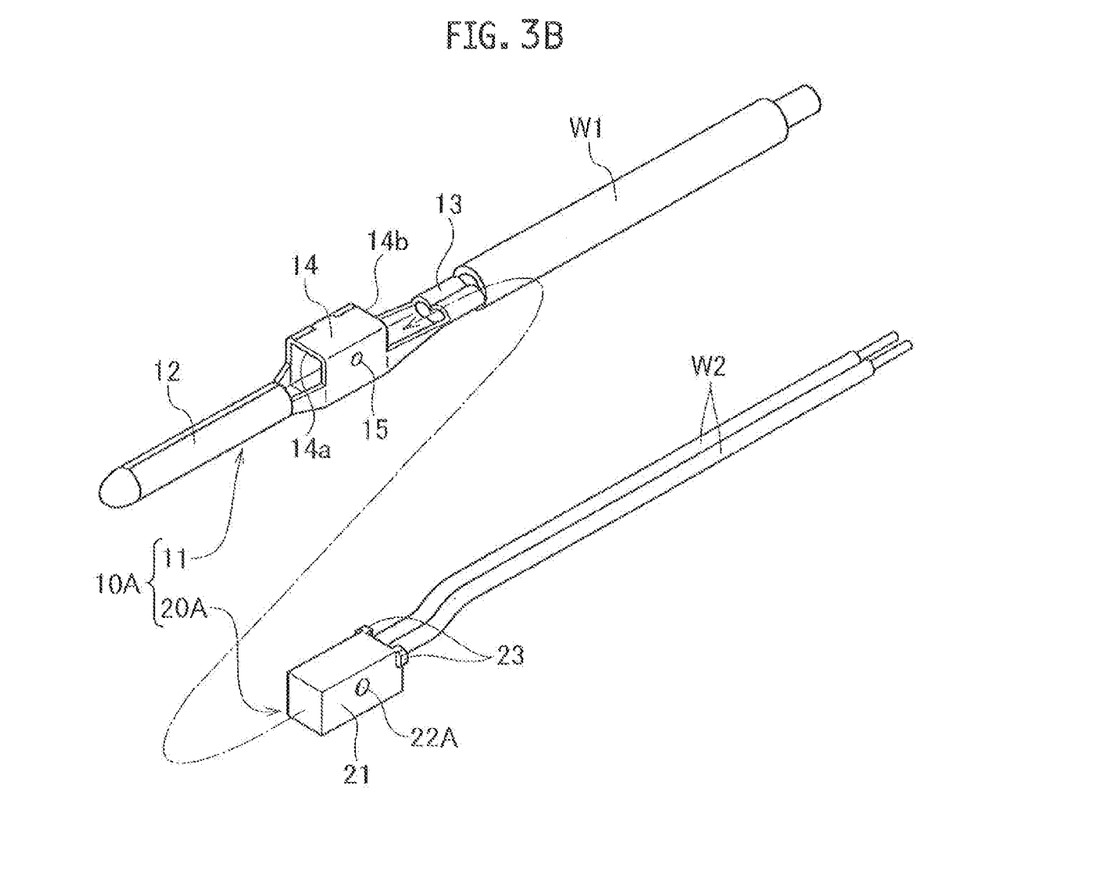
FIG. 3B shows the first embodiment of the present invention, and is a perspective view of the terminal before a temperature sensor is assembled to a terminal body.
Figure 4:
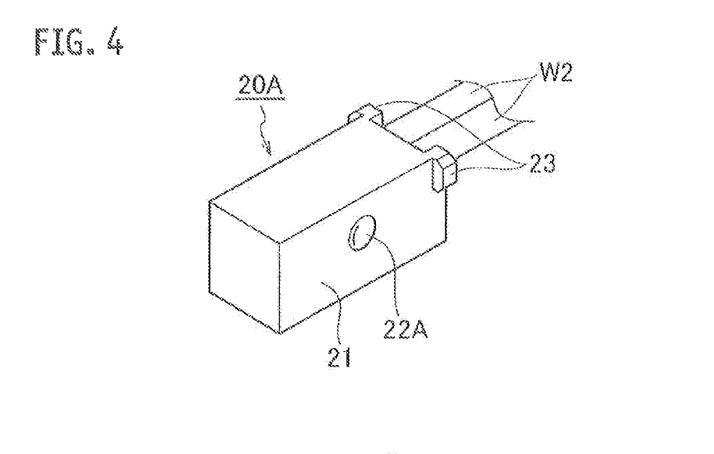
FIG. 4 shows the first embodiment of the present invention, and is a perspective view of the temperature sensor.

As shown in FIGS. 3A, 3B, and 4, the power-reception terminal 10A includes: a conductive terminal body 11; an insulating tip insulation part 19 that is fixed to the terminal body 11, and that projects forward from a tip of a mating terminal contact part 12 that will be described later; and a thermistor 20A that is a temperature sensor fixed to the terminal body 11.

The terminal body 11 is formed by bending a conductive plate having a predetermined shape, by press working. The terminal body 11 includes: the mating terminal contact part 12 with which a mating female terminal (not shown) is brought into contact; an electrical wire connection part 13 that is connected to the electrical wire W1; and a sensor fixing part 14 provided between the mating terminal contact part 12 and the electrical wire connection part 13. The mating terminal contact part 12 is formed in a cylindrical rod shape. Namely, the terminal 10A is a male terminal. The sensor fixing part 14 has a square cylindrical shape with a dimension in which the thermistor 20A is substantially inserted without any gaps. A locking hole 15 is formed in a pair of side walls of the sensor fixing part 14, respectively. Each locking hole 15 is a circular hole.

The thermistor 20A has: a housing 21 having a rectangular parallelepiped shape; and a sensor (not shown) arranged in the housing 21, as shown in detail in FIG. 4. An electrical wire W2 for output from the sensor is pulled out to an outside from a rear end of the housing 21. A lock part 22A is formed in a pair of side walls of the housing 21, respectively. Each lock part 22A is locked to each locking hole 15 of the sensor fixing part 14. A stopper wall part 23 is protrusively provided at rear ends of a pair of side surfaces of the housing 21, respectively. The pair of stopper wall parts 23 abut against a rear end surface of the sensor fixing part 14 in a state where the thermistor 20A is assembled to the sensor fixing part 14. The sensor (not shown) outputs an electrical signal according to its outer peripheral temperature.

Figure 5A:
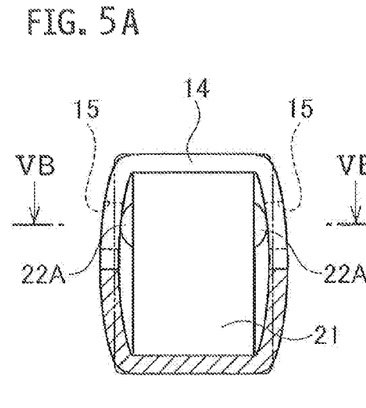
FIG. 5A shows the first embodiment of the present invention, and is an elevational view showing a state in the middle of insertion of a thermistor in a sensor fixing part.
Figure 5B:
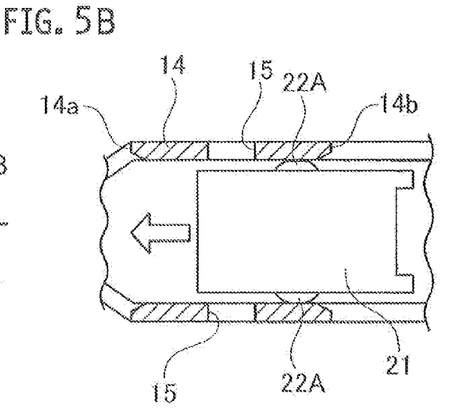
FIG. 5B shows the first embodiment of the present invention, and is a cross-sectional view of an VB-VB line of FIG. 5A.

In assembly of the thermistor 20A to the terminal body 11, the thermistor 20A is inserted in the sensor fixing part 14 from the rear of the terminal body 11 as shown in FIGS. 3A and 3B. In that case, first, the pair of lock parts 22A abut against a rear end surface 14b of the sensor fixing part 14. When the thermistor 20A is inserted deeper into the sensor fixing part 14 from the abutting state, as shown in FIGS. 5A and 5B, the pair of side walls of the sensor fixing part 14 are elastically deformed so as to bulge outward by receiving external forces from the lock parts 22A, to thereby allow insertion of the thermistor 20A. Namely, the pair of side walls of the sensor fixing part 14 are elastically deformed from a virtual line state to a continuous line state shown in FIG. 5A.

Figure 5C:
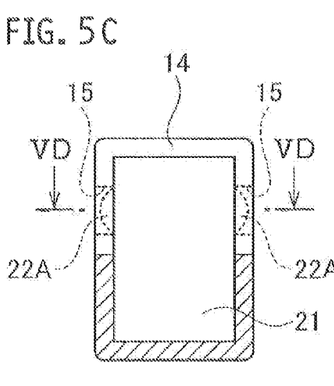
FIG. 5C shows the first embodiment of the present invention, and is an elevational view showing a state where the thermistor is inserted in the sensor fixing part.
Figure 5D:
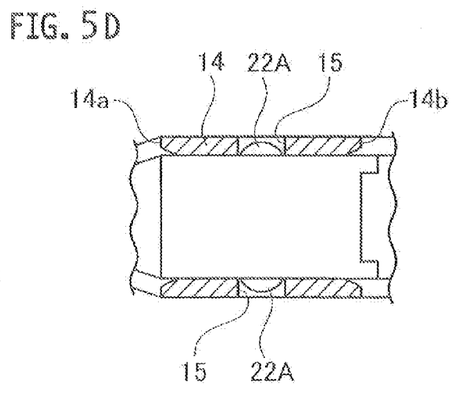
FIG. 5D shows the first embodiment of the present invention, and is a cross-sectional view of a VD-VD line of FIG. 5C.

When the thermistor 20A is inserted to a position where the pair of stopper wall parts 23 thereof abut against the rear end surface 14b of the sensor fixing part 14, the pair of lock parts 22A are located at positions of the pair of locking holes 15, and as shown in FIGS. 5C and 5D, the pair of side walls of the sensor fixing part 14 are restored and deformed, and the pair of lock parts 22A are inserted in and locked to the pair of locking holes 15 (refer to FIG. 3A). As a result, assembly of the thermistor 20A is completed. Movement of the thermistor 20A in its insertion direction is restricted by the pair of stopper wall parts 23 and the pair of lock parts 22A, movement thereof in an extraction direction (a counter-insertion direction) is restricted by the pair of lock parts 22A, and thus the thermistor 20A is fixed to the terminal body 11.

Figure 6:
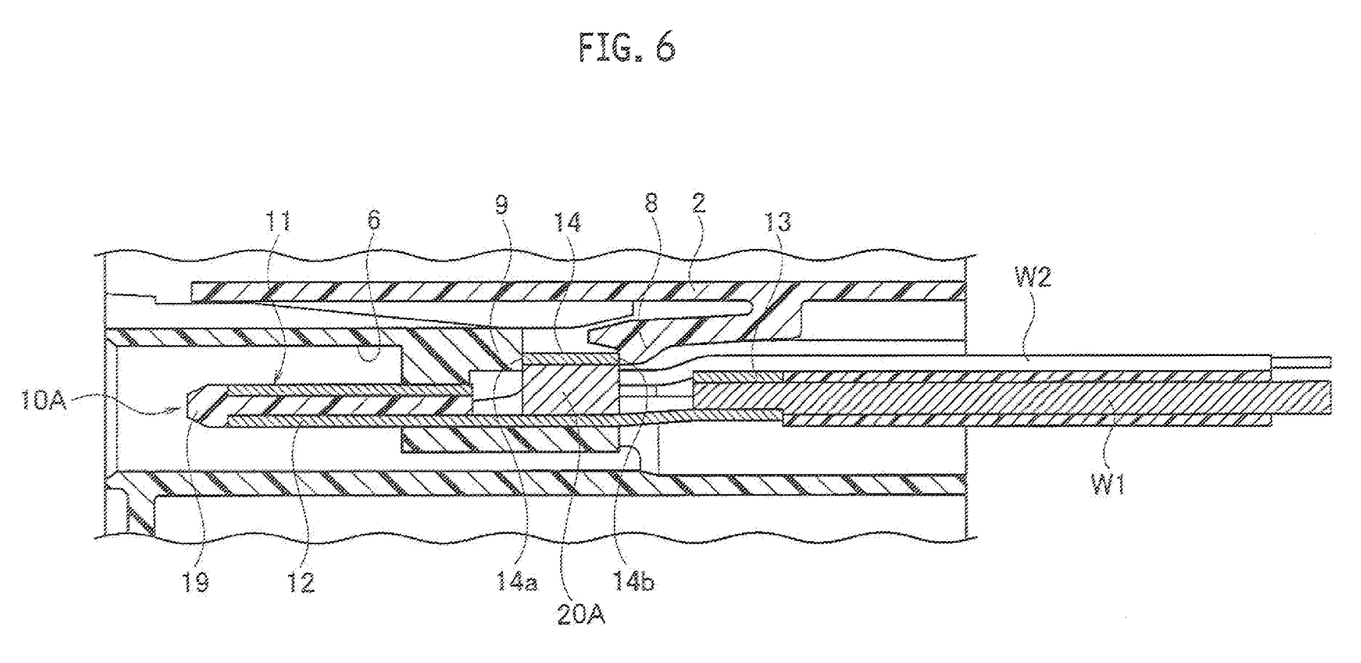
FIG. 6 shows the first embodiment of the present invention, and is a cross-sectional view showing a state where the terminal is housed in a terminal housing chamber.

FIG. 6 shows a cross-sectional view of the terminal housing chamber 6 and the terminal 10A. FIG. 6 shows the cross-sectional view in a surface that passes through a center of the electrical wire W1 in a state where the terminal 10A is inserted in the terminal housing chamber 6.

In insertion work of the terminal 10A in the terminal housing chamber 6, the terminal 10A is inserted in the terminal housing chamber 6 from the rear of the connector housing 2. In that case, a front end surface 14a of the sensor fixing part 14 abuts against to a lance 8, and when the terminal 10A is further inserted from this state, the lance 8 is bent and deformed to thereby allow insertion of the terminal 10A. When the terminal 10A is inserted to a position where the front end surface 14a of the sensor fixing part 14 abuts against an insertion restriction part 9 of the connector housing 2, the lance 8 is restored and deformed to thereby be locked to the rear end surface 14b of the sensor fixing part 14. Movement of the terminal 10A in a terminal insertion direction and a terminal extraction direction is prevented by the insertion restriction part 9 and the lance 8, and the terminal 10A is positioned at the insertion position. That is, the sensor fixing part 14 functions not only as a fixing part of the thermistor 20A but also as a locking part of the terminal 10A to the lance 8. Namely, the sensor fixing part 14 has a positioning function (a terminal extraction prevention function) of the terminal 10A in the terminal housing chamber 6.

According to the terminal 10A having the above-described configuration, the thermistor 20A is assembled to the terminal 10A itself, and thus, when the mating terminal contact part 12 generates heat by energization of overcurrent, the heat generation temperature is directly transferred to the thermistor 20A through the terminal 10A. Accordingly, the thermistor 20A can detect with high accuracy the heat generation temperature by energization of the overcurrent of a terminal connection point.

Since the terminal 10A is applied to the charging connector 1, the thermistor 20A can detect with high accuracy the heat generation temperature by energization of the overcurrent at the time of power reception. Therefore, damage of the connector housing 2 and the electrical wire W1 can be reliably prevented.

Since the sensor fixing part 14 has a cylindrical shape in which the thermistor 20A is inserted in accordance with a shape of the thermistor 20A, a temperature from the sensor fixing part 14 is transferred from a whole periphery of the thermistor 20A. Accordingly, temperature transfer from the terminal body 11 to the thermistor 20A can be quickly performed.

The thermistor 20A has the lock parts 22A, is allowed to be inserted in the sensor fixing part 14 by elastic deformation of the sensor fixing part 14, and at an insertion completion position, the lock part 22A is locked to the sensor fixing part 14 by restoring deformation of the sensor fixing part 14. Accordingly, assembly work of the thermistor 20A is easy.

Besides, when a force is applied to the thermistor 20A in a direction of removing the thermistor 20A from the sensor fixing part 14 in a state where the thermistor 20A is assembled to the terminal body 11, the pair of side walls of the sensor fixing part 14 are elastically deformed so as to bulge outward by receiving the external forces from the lock parts 22A, and the thermistor 20A is allowed to be removed from the sensor fixing part 14. Namely, since the thermistor 20A can be easily removed from the terminal body 11, recycling also becomes easy.

Since the sensor fixing part 14 is provided between the mating terminal contact part 12 and the electrical wire connection part 13, a temperature due to heat generation of the mating terminal contact part 12 is transferred to the thermistor 20A through the sensor fixing part 14 more quickly and accurately than the electrical wire connection part 13. Accordingly, the thermistor 20A can perform prompt and accurate detection.

Note that although the locking hole 15 is set to be the circular hole in the present embodiment, a shape of the locking hole 15 may just be a shape to which the lock part 22A can be locked, and may be an oval shape, a square shape, or the like.

In addition, although the position where the locking hole 15 is provided is formed in the pair of side walls of the sensor fixing part 14, the position may be provided in a bottom plate or a top plate of the sensor fixing part 14. In this case, the lock part 22A may be formed at a bottom surface or an upper surface of the housing 21 of the thermistor 20A so as to correspond to the position where the locking hole 15 is formed.

The locking holes 15 formed in the sensor fixing part 14 and the lock parts 22A formed in the housing 21 of the thermistor 20A are formed in positions corresponding to each other, and the lock parts 22A can be locked to the locking holes 15, an thus the thermistor 20A can be fixed to an appropriate position with respect to the terminal body 11. As a result, the thermistor 20A can quickly and accurately detect the temperature due to the heat generation of the mating terminal contact part 12 through the sensor fixing part 14.

In addition, in the present embodiment, the locking holes 15 are formed in the sensor fixing part 14, and the lock parts 22A are formed in the housing 21 of the thermistor 20A, but this positional relation may be opposite. Namely, the locking holes 15 may be formed in the housing 21 of the thermistor 20A, and the lock parts 22A may be formed in the sensor fixing part 14. Namely, the locking holes 15 and the lock parts 22A may just be in a positional relation in which they can be locked to each other.

Second Embodiment

Figure 7A:
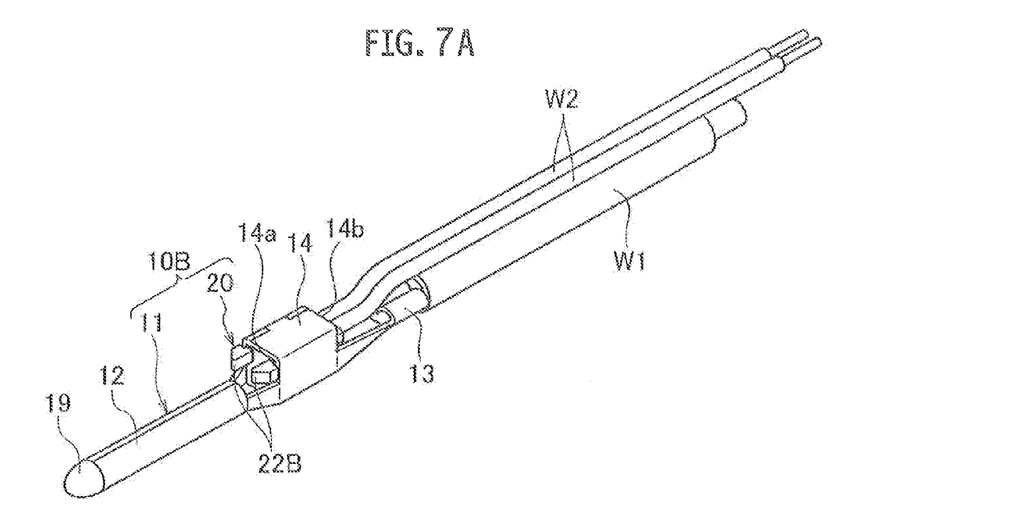
FIG. 7A shows a second embodiment of the present invention, and is a perspective view of a terminal.
Figure 7B:
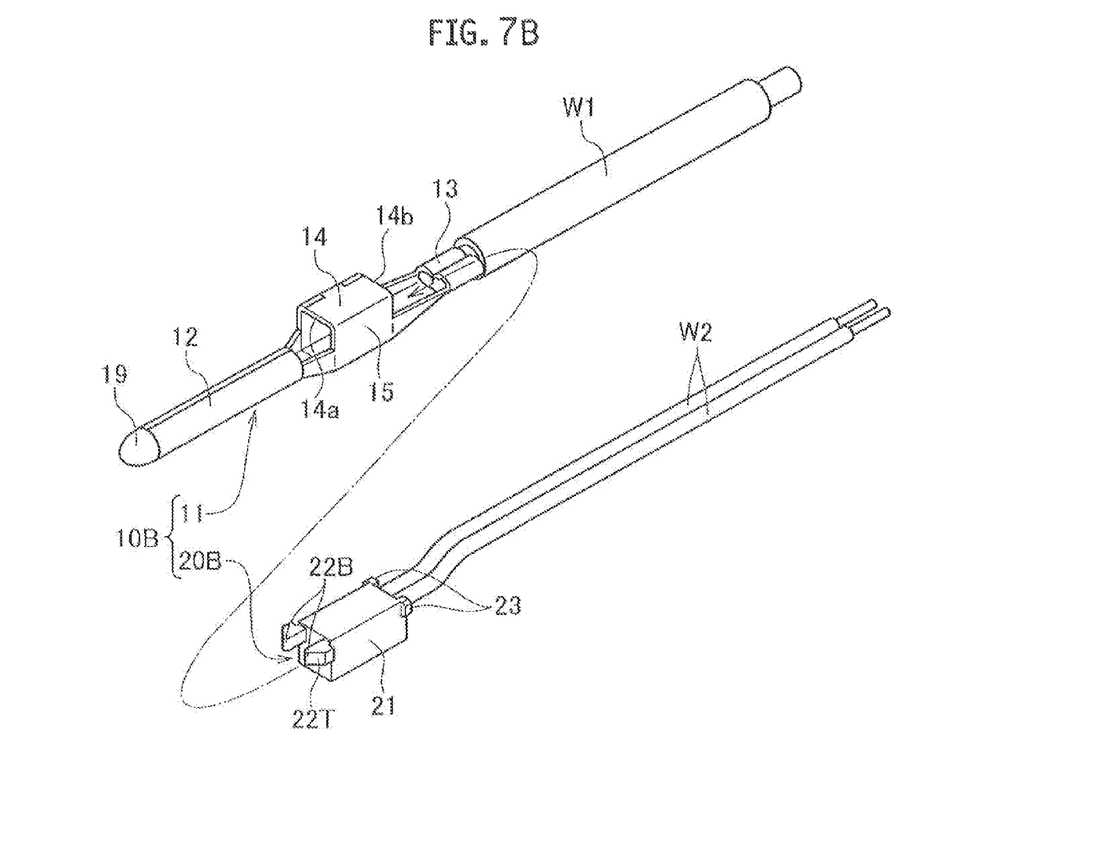
FIG. 7B shows a second embodiment of the present invention, and is a perspective view of the terminal before a temperature sensor is assembled to a terminal body.
Figure 8:
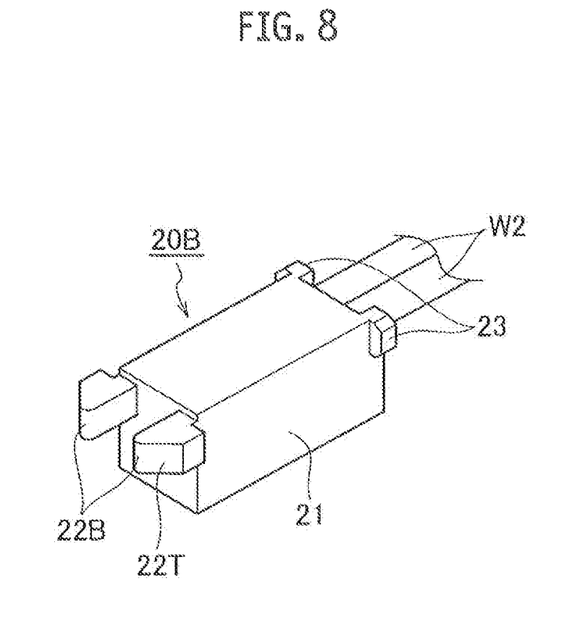
FIG. 8 shows the second embodiment of the present invention, and is a perspective view of the temperature sensor.

FIGS. 7A, 7B, and 8 show a second embodiment of the present invention. A terminal 10B of the second embodiment includes: the terminal body 11; and a thermistor 20B that is a temperature sensor, in the same way as in the first embodiment.

Although the sensor fixing part 14 of the terminal body 11 is a square-shaped cylindrical body similarly to the first embodiment, it does not have the pair of locking holes 15 as in the first embodiment.

The thermistor 20B has a pair of lock parts 22B and a pair of stopper wall parts 23 in the same way as in the first embodiment. Although the pair of stopper wall parts 23 have a configuration similar to that of the first embodiment, the pair of lock parts 22B are located at right and left positions of a front end of the housing 21, and project to the right and left from side surfaces of the housing 21. A front end surface of each lock part 22B is formed as a tapered surface 22T. Namely, when each tapered surface 22T receives a pressing force from the front, the lock parts 22B are bent and deformed in directions of approaching each other, and the lock parts 22B can transition to a state of not projecting from the side surfaces of the housing 21.

Since other configurations are similar to those of the first embodiment, the same symbols are attached to the same configuration points of the drawings, and explanation thereof is omitted.

In assembly of the thermistor 20B to the terminal body 11, the thermistor 20B is inserted in the sensor fixing part 14 from the rear of the terminal body 11 as shown in FIG. 7B. In that case, first, the pair of lock parts 22B abut against the rear end surface 14b of the sensor fixing part 14. When the thermistor 20B is inserted deeper into the sensor fixing part 14 from this state, each lock part 22B is guided by each tapered surface 22T, and is bent and deformed in the directions of approaching each other, thereby allow insertion of the thermistor 20B. When the thermistor 20B is inserted to a position where the pair of stopper wall parts 23 thereof abut against the rear end surface 14b of the sensor fixing part 14, the pair of lock parts 22B are extracted to the front of the sensor fixing part 14, and are bent, restored, and deformed to thereby be locked to the front end surface 14a of the sensor fixing part 14 (refer to FIG. 7A). Therefore, assembly of the thermistor 20B is completed. Movement of the thermistor 20B in its insertion direction is restricted by the pair of stopper wall parts 23, movement thereof in an extraction direction (a counter-insertion direction) is restricted by the pair of lock parts 22B, and thus the thermistor 20B is fixed to the terminal body 11.

Insertion work of the terminal 10B in the terminal housing chamber 6 is similar to that of the first embodiment. Additionally, in the same way as in the first embodiment, at an insertion completion position of the terminal 10B, the front end surface 14a of the sensor fixing part 14 abuts against an insertion restriction part of a connector housing (not shown), and a lance (not shown) is locked to the rear end surface 14b of the sensor fixing part 14. Movement of the terminal 10B in a terminal insertion direction and a terminal extraction direction is prevented by the insertion restriction part and the lance, and the terminal 10B is positioned at the insertion position. Namely, the sensor fixing part 14 serves also as a locking part to the lance, and has a positioning function (a terminal extraction prevention function) in a terminal housing chamber (not shown) of the terminal 10B.

According to the terminal 10B having the above-described configuration, since the thermistor 20B is assembled to the terminal 10B itself, the thermistor 20B can detect, with high accuracy, a heat generation temperature by energization of overcurrent of a terminal connection point for a reason similar to the first embodiment.

Since the sensor fixing part 14 has a cylindrical shape in which the thermistor 20B is inserted, temperature transfer from the terminal body 11 to the thermistor 20B can be quickly performed in the same way as in the first embodiment.

The thermistor 20B has the lock parts 22B, is allowed to be inserted in the sensor fixing part 14 by bending deformation of the lock parts 22B, and at an insertion completion position, the lock part 22B is fixed to the sensor fixing part 14 by restoring elastic deformation. Accordingly, assembly work of the thermistor 20B is easy for the same reason as in the first embodiment.

When the thermistor 20B is removed from the terminal body 11, a force is applied to the lock parts 22B, the lock parts 22B are bent and deformed in directions of not projecting from the side surfaces of the housing 21, the thermistor 20B may just be extracted to the rear of the terminal body 11 in that state, and thus it is also easy to remove the thermistor 20B from the terminal body 11. For that reason, recycling also becomes easy.

Since the sensor fixing part 14 is provided between the mating terminal contact part 12 and the electrical wire connection part 13, the thermistor 20B can perform quick and accurate detection for the same reason as in the first embodiment.

The sensor fixing part 14 serves also as the locking part to the lance (not shown), and has the positioning function (the terminal extraction prevention function) in the terminal housing chamber of the terminal 10B, in the same way as in the first embodiment.

Modification

In the first embodiment, the sensor fixing part 14 is elastically deformed to thereby allow insertion of the thermistor 20A in assembling the thermistor 20A to the sensor fixing part 14, and in the second embodiment, the lock parts 22B is elastically deformed to thereby allow insertion of the thermistor 20B in assembling the thermistor 20B to the sensor fixing part 14. As described above, the present invention may be configured so that either one of the sensor fixing part 14, and the lock parts 22A and 22B of the thermistors 20A and 20B is elastically deformed, but the present invention may be configured so that both of the sensor fixing part 14, and the lock parts 22A and 22B of the thermistors 20A and 20B are elastically deformed.

Although the sensor fixing part 14 has the square cylindrical shape in the first and second embodiments, it may just have a shape to which the thermistors 20A and 20B can be fixed, and it may have a circular cylindrical shape (a cylinder shape), a horizontal U-shape, or a vertical U-shape.

Although the terminals 10A and 10B are applied to the charging connector 1 in the first and second embodiments, it is needless to say that a terminal of the present invention can be applied to electrical equipment (connectors other than the charging connector are included) other than the charging connector 1.

Hereinbefore, although the embodiments of the present invention have been explained, these embodiments are merely exemplifications described in order to facilitate understanding of the present invention, and the present invention is not limited to the embodiments. A technical scope of the present invention is not limited to specific technical matters disclosed in the above-described embodiments, and various modifications, changes, alternative technologies, and the like that can be easily derived from the technical matters are also included.

INDUSTRIAL APPLICABILITY

According to the present invention, a temperature sensor is assembled to a terminal itself, and thus, when a mating terminal contact part generates heat by energization of overcurrent, the heat generation temperature is directly transferred to the temperature sensor through the terminal. Accordingly, the heat generation temperature by energization of the overcurrent of the terminal connection point can be detected with high accuracy.

REFERENCE SIGNS LIST 1 charging connector
2 connector housing
10A, 10B terminal

11 terminal body
12 mating terminal contact part
13 electrical wire connection part
14 sensor fixing part
20A, 20B thermistor (temperature sensor)
22A, 22B lock part

The invention claimed is:

1. A terminal comprising:
   a terminal body that has a mating terminal contact part with which a mating terminal is brought into contact, and a sensor fixing part; and
   a temperature sensor fixed to the sensor fixing part, wherein
   the sensor fixing part has a hollow portion in which the temperature sensor is inserted,
   the temperature sensor has a lock part, is allowed to be inserted in the sensor fixing part by elastic deformation of at least either one of the lock part and the sensor fixing part, and at an insertion completion position, the lock part is locked to the sensor fixing part by restoring elastic deformation,
   the terminal body has an electrical wire connection part, and
   the sensor fixing part is provided between the mating terminal contact part and the electrical wire connection part.

2. A charging connector comprising: the terminal according to claim 1; and a connector housing that houses the terminal.

\* \* \* \* \*